United States Patent
Kim et al.

(10) Patent No.: US 9,065,112 B2
(45) Date of Patent: Jun. 23, 2015

(54) SECONDARY BATTERY MODULE WITH SHORT-CIRCUIT PROTECTOR

(75) Inventors: Dukjung Kim, Yongin-si (KR); Jaeik Kwon, Yongin-si (KR)

(73) Assignees: SAMSUNG SDI CO., LTD., Yongin-si, Gyeonggi-do (KR); ROBERT BOSCH GmbH, Stuttgart (DE)

(*) Notice: Subject to any disclaimer, the term of this patent is extended or adjusted under 35 U.S.C. 154(b) by 238 days.

(21) Appl. No.: 13/611,515

(22) Filed: Sep. 12, 2012

(65) Prior Publication Data

US 2013/0252038 A1 Sep. 26, 2013

(30) Foreign Application Priority Data

Mar. 23, 2012 (KR) .................. 10-2012-0029985

(51) Int. Cl.
| | |
|---|---|
| H01M 2/02 | (2006.01) |
| H01M 2/06 | (2006.01) |
| H01M 2/20 | (2006.01) |
| H01M 2/30 | (2006.01) |
| H01M 2/10 | (2006.01) |
| H01M 2/34 | (2006.01) |
| H01M 10/42 | (2006.01) |
| H01M 10/44 | (2006.01) |
| H01M 10/48 | (2006.01) |

(52) U.S. Cl.
CPC ............ *H01M 2/1077* (2013.01); *H01M 2/206* (2013.01); *H01M 2/345* (2013.01); *H01M 10/425* (2013.01); *H01M 10/441* (2013.01); *H01M 10/482* (2013.01)

(58) Field of Classification Search
CPC ... H01M 2/1077; H01M 2/206; H01M 2/345; H01M 10/425; H01M 10/441; H01M 10/482
USPC ............. 429/61, 159, 161, 163, 56; 320/134
See application file for complete search history.

(56) References Cited

U.S. PATENT DOCUMENTS

| | | | | |
|---|---|---|---|---|
| 5,585,207 | A  * | 12/1996 | Wakabe et al. | 429/178 |
| 6,365,297 | B1 * | 4/2002 | Wolczak et al. | 429/159 |
| 2002/0070707 | A1 * | 6/2002 | Sato | 320/134 |
| 2011/0039136 | A1 * | 2/2011 | Byun et al. | 429/56 |
| 2011/0052949 | A1 * | 3/2011 | Byun et al. | 429/61 |
| 2011/0135976 | A1 | 6/2011 | Byun | |
| 2011/0183193 | A1 | 7/2011 | Byun et al. | |

FOREIGN PATENT DOCUMENTS

| | | |
|---|---|---|
| KR | 10-2011-0065277 A | 6/2011 |
| KR | 10-1042808 B1 | 6/2011 |

* cited by examiner

*Primary Examiner* — Kenneth Douyette
(74) *Attorney, Agent, or Firm* — Lee & Morse, P.C.

(57) ABSTRACT

A secondary battery module includes a plurality of secondary batteries, and each of the secondary batteries includes an electrode assembly, a case accommodating the electrode assembly, an electrode terminal electrically connected to the electrode assembly, a first short-circuit member electrically connected to the electrode terminal, and the first short-circuit member is configured to protrude outwardly from the case when an internal pressure of the case exceeds a preset pressure. The secondary battery module also includes a connecting member electrically connecting electrode terminals of adjacent ones of the secondary batteries, and a second short-circuit member overlapping the first short-circuit member of at least one of the plurality of secondary batteries such that the second short-circuit member contacts the first short-circuit member when the first short-circuit member protrudes outwardly from the case.

21 Claims, 7 Drawing Sheets

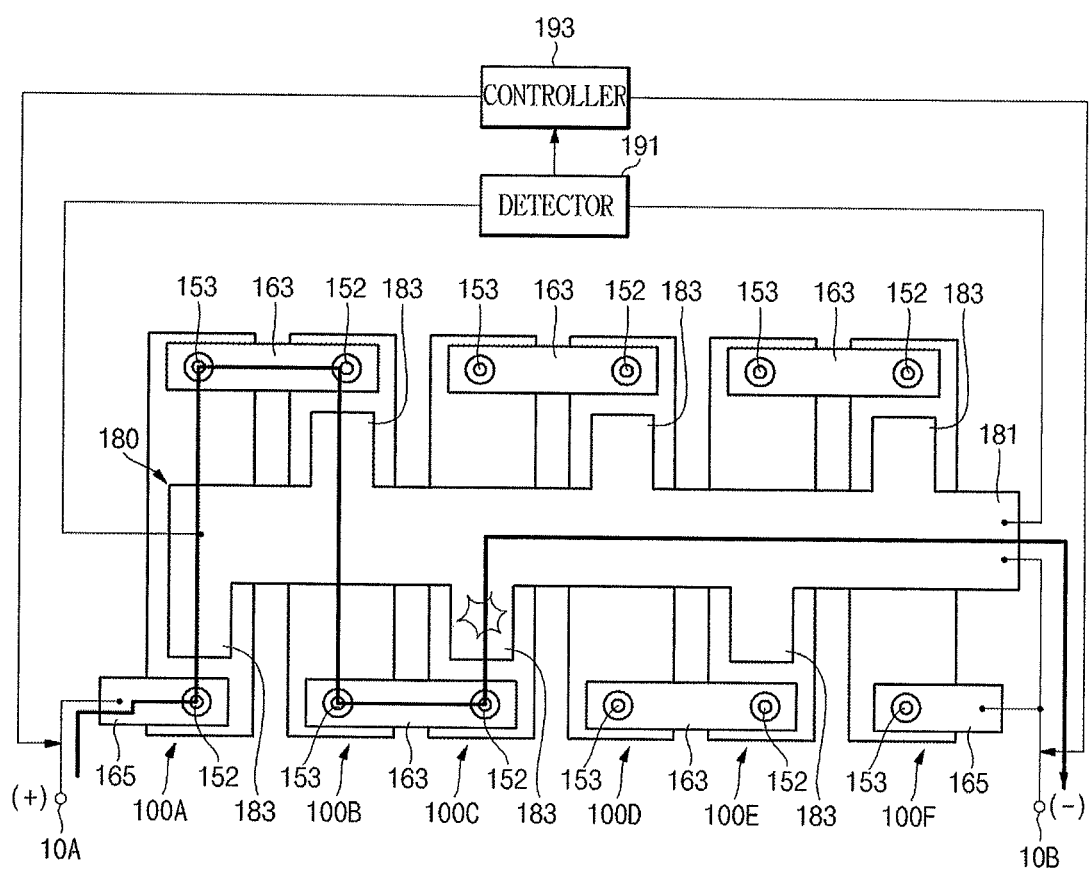

SECONDARY BATTERY MODULE WITH SHORT-CIRCUIT PROTECTOR

BACKGROUND

A secondary battery module may include a plurality of secondary batteries connected to each other in series. Each of the secondary batteries may constitute a single unit battery. Each of the unit batteries may include an electrode assembly having a positive electrode and a negative electrode and a case accommodating the electrode assembly therein.

SUMMARY

Embodiments may be realized by providing a secondary battery module that includes a plurality of secondary batteries, and each of the secondary batteries includes an electrode assembly, a case accommodating the electrode assembly, an electrode terminal electrically connected to the electrode assembly, and a first short-circuit member electrically connected to the electrode terminal, the first short-circuit member being configured to protrude outwardly from the case when an internal pressure of the case exceeds a preset pressure. The secondary battery module also includes a connecting member electrically connecting electrode terminals of adjacent ones of the secondary batteries, and a second short-circuit member overlapping the first short-circuit member of at least one of the plurality of secondary batteries, the second short-circuit member contacts the first short-circuit member when the first short-circuit member protrudes outwardly from the case.

The secondary battery module may include a detector that detects a voltage applied to the second short-circuit member when the first short-circuit member protrudes outwardly from the case. The secondary battery module may include a controller that controls charging of the secondary batteries according to whether the voltage is detected by the detector.

When the voltage is detected by the detector, the controller may control charging of the secondary batteries to be interrupted. The electrode assembly of each of the secondary batteries may include a first electrode plate, a second electrode plate, and a separator arranged between the first electrode plate and the second electrode plate. The electrode terminal of each of the secondary batteries may include a first electrode terminal electrically connected to the first electrode plate and a second electrode terminal electrically connected to the second electrode plate.

The first short-circuit member of each of the secondary batteries may include a pipe member having a first side electrically connected to the first electrode terminal, and the pipe member having a second side penetrating a cap plate on the case. The second side may be exposed to an outside of the case. The first short-circuit member of each of the secondary batteries may include an inversion plate covering an opening at the second side of the pipe member. The inversion plate may be configured to invert when the internal pressure exceeds the preset pressure.

Each of the secondary batteries may include a first current collector electrically connecting the first electrode plate, the first electrode terminal, and the first short-circuit member, and a second current collector electrically connecting the second electrode plate and the second electrode terminal. The first current collector may include a first connecting part connected to the first electrode terminal and the first short-circuit member. The first current collector may include a first extending part extending from the first connecting part and coupled to the first electrode plate. The first short circuit member may be coupled to a connection hole in the first connecting part.

The first short-circuit member of each of the secondary batteries may include a pipe member having a first side coupled to the connection hole of the first connecting part. The pipe member may have a second side penetrating a cap plate on the case and the second side may be exposed to an outside of the case. The first side of the pipe member may be connected to an inside of the case though the connection hole of the first connecting part. The first short-circuit member of each of the secondary batteries may include an inversion plate covering an opening at the second side of the pipe member. The inversion plate may be configured to invert when the internal pressure exceeds the preset pressure.

The second short-circuit member may include a center part electrically connected to an external terminal, and a plurality of branch parts extending from the center part. Each of the plurality of branch parts may face the inversion plate of the first short-circuit member of a corresponding one of the plurality of secondary batteries. The second current collector of each of secondary batteries may include a second connecting part connected to the second electrode terminal, and a second extending part extending from the second connecting part and coupled to the second electrode plate of the electrode assembly.

The second short-circuit member may include a center part electrically connected to an external terminal, and a plurality of branch parts extending from the center part. Each of the plurality of branch parts may face an inversion plate of the first short-circuit member of a corresponding one of the plurality of secondary batteries. In each of secondary batteries, the electrode terminal and the first short-circuit member may be electrically insulated from the case.

The second short-circuit member may be electrically connected to an external electrode terminal of the secondary battery module. The connecting member may include a plurality of connecting members, and the connecting members may overlap opposing end regions of the secondary batteries. The second short-circuit member may overlap each of the secondary batteries along a central region of the secondary batteries, and the central region may be between the opposing end regions.

The plurality of secondary batteries may be arranged in a serial connection such that the secondary batteries are serially connected to each other. The second short-circuit member may be a by-pass route for the serial connection between the plurality of secondary batteries. When the internal pressure of the case may be below the preset pressure, the second short-circuit member may be in a non-contacting relationship with the first short-circuit member of the at least one of the plurality of secondary batteries and the first short circuit member may protrude inwardly toward the electrode assembly.

Embodiments may also be realized by providing a secondary battery module that includes a plurality of secondary batteries connected to each other in series as unit batteries, wherein abnormal ones of the plurality of secondary batteries each have an internal pressure that exceeds a preset pressure and are electrically connected to an external electrode terminal of the secondary battery module such that current flows directly from the abnormal ones of the plurality of the secondary batteries to the external electrode terminal of the secondary battery module.

Each of secondary batteries may include an electrode assembly, a case accommodating the electrode assembly, an electrode terminal electrically connected to the electrode assembly, and a first short-circuit member electrically connected to the electrode terminal. The first short-circuit member may be configured to protrude outwardly from the case when an internal pressure of the case exceeds a preset pressure.

The secondary battery module may include a second short-circuit member electrically connected to the external electrode terminal of the secondary battery module. The second short-circuit member may overlap the first short-circuit member of at least one of the plurality of secondary batteries such that the second short-circuit member contacts the first short-circuit member when the first short circuit member protrudes outwardly from the case.

BRIEF DESCRIPTION OF THE DRAWINGS

Features will become apparent to those of ordinary skill in the art by describing in detail exemplary embodiments with reference to the attached drawings in which:

FIG. 7 illustrates a top view of an operation of the secondary battery module according to an exemplary embodiment in an event of overcharge.

DETAILED DESCRIPTION

Figure 1:
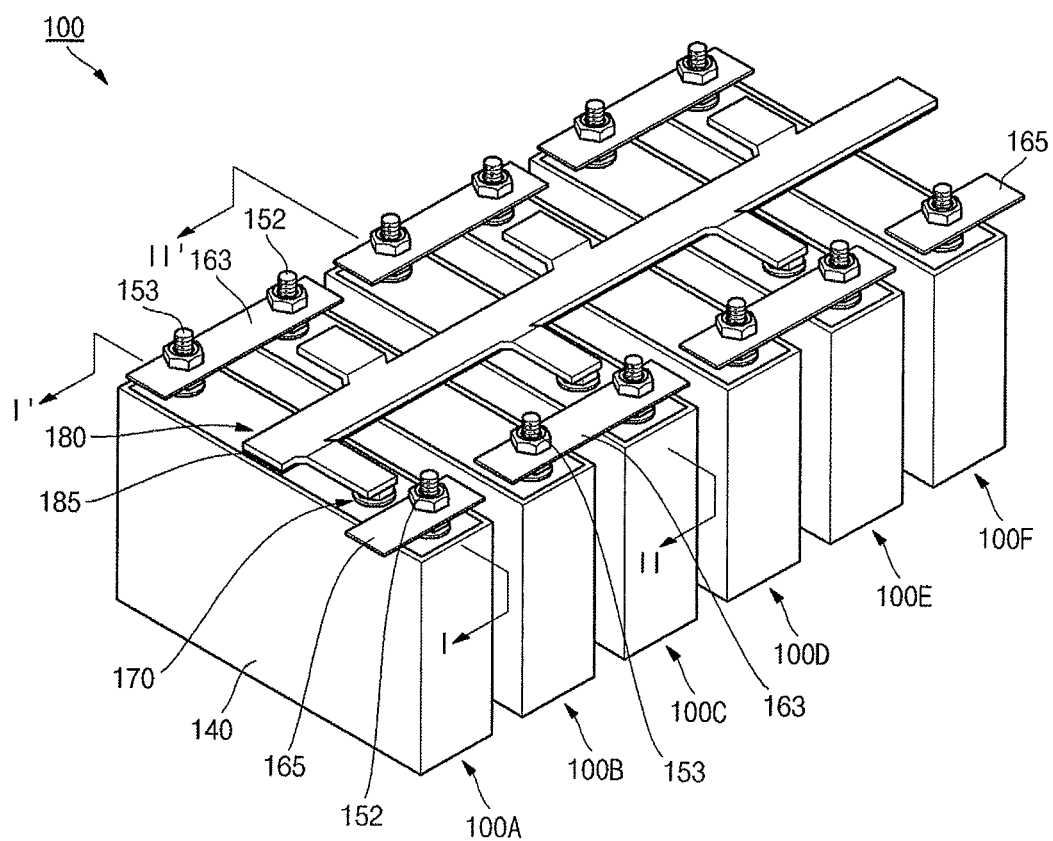
FIG. 1 illustrates a perspective view of a secondary battery module according to an exemplary embodiment.

Korean Patent Application No. 10-2012-0029985, filed on Mar. 23, 2012, in the Korean Intellectual Property Office, and entitled: "Secondary Battery Module," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 2:
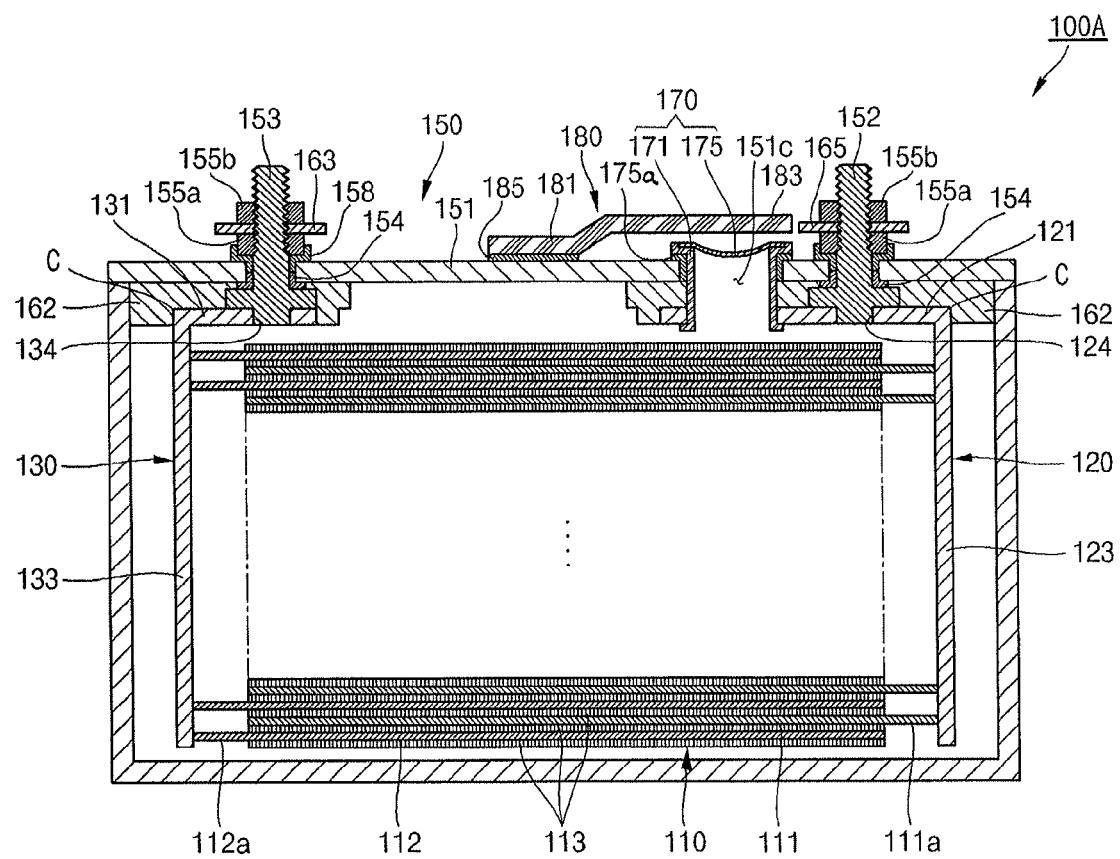
FIG. 2 illustrates a cross-sectional view of the secondary battery module taken along the line I-I' of FIG. 1.
Figure 3:
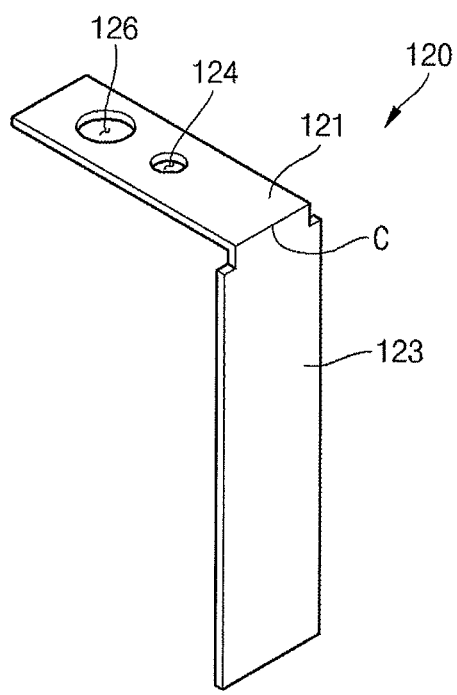
FIG. 3 illustrates a perspective view of a first current collector according to an exemplary embodiment.
Figure 4:
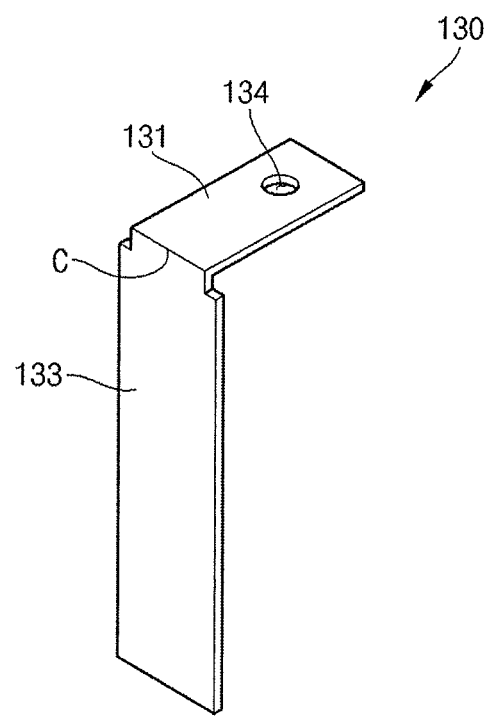
FIG. 4 illustrates a perspective view of a second current collector according to an exemplary embodiment.
Figure 5:
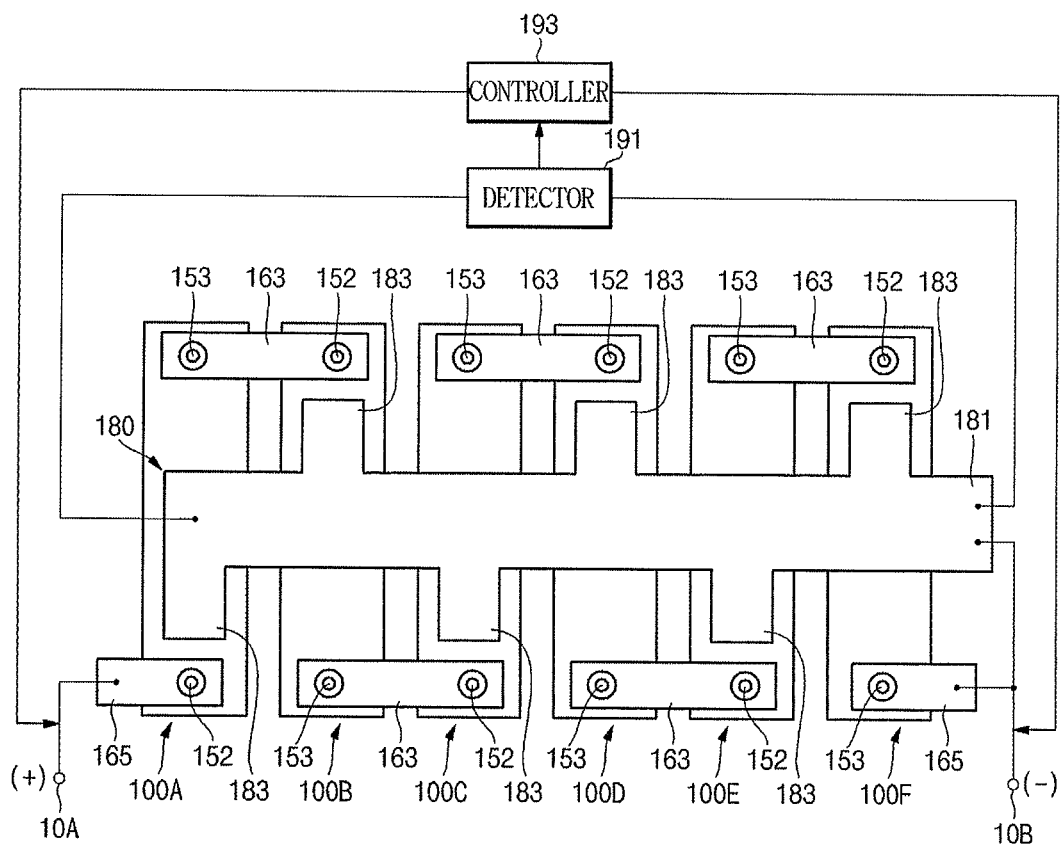
FIG. 5 illustrates additional components of the secondary battery module with a top view of the secondary battery module shown in FIG. 1.

FIG. 1 illustrates a perspective view of a secondary battery module 100 according to an exemplary embodiment, FIG. 2 illustrates a cross-sectional view of the secondary battery module 100 taken along the line I-I' of FIG. 1, FIG. 3 illustrates a perspective view of a first current collector 120 according to an exemplary embodiment, FIG. 4 illustrates a perspective view of a second current collector 130 according to an exemplary embodiment, and FIG. 5 illustrates additional components of a secondary battery module taken from a top view with respect to the secondary battery module 100 shown in FIG. 1.

Referring to FIGS. 1 to 5, the secondary battery module 100, according to an exemplary embodiment, may include a plurality of interconnected secondary batteries 100A to 100F. The secondary battery module 100 may include a first connecting member 163 connecting ones first to sixth secondary batteries 100A, 100B, 100C, 100D, 100E, and 100F to each other, e.g., the first connecting member 163 may include a plurality of first connecting members 163 that each overlap and is coupled with at least two of the first to sixth secondary batteries 100A, 100B, 100C, 100D, 100E, and 100F. The secondary battery module 100 may include a second short-circuit member 180, e.g., the second short-circuit member 180 may overlap and be coupled with each of the first to sixth secondary batteries 100A, 100B, 100C, 100D, 100E, and 100F.

The secondary battery module 100, according to an exemplary embodiment, may include the first to sixth secondary batteries 100A, 100B, 100C, 100D, 100E, and 100F as unit batteries. In the exemplary embodiment, six secondary batteries are provided for illustration only. The secondary battery module may include two or more secondary batteries as unit batteries. Each of the unit batteries may be connected in series within the secondary battery module 100.

Hereinafter, configurations of the secondary batteries, according to an exemplary embodiment, will be described. Each of the secondary batteries may have a same configuration. The configurations of the secondary batteries will now be described with regard to a first secondary battery 100A by way of example.

The first secondary battery 100A may include an electrode assembly 110, a first current collector 120, a second current collector 130, a case 140, a first electrode terminal 152 connected to the first current collector 12, a second electrode terminal 153 connected to the second current collector 130, and a first short-circuit member 170.

The electrode assembly 110 may be formed by winding or stacking a first electrode plate 111, a separator 113, and a second electrode plate 112, which may have a thin plate or film shape. The first electrode plate 111 may function as a positive electrode and the second electrode plate 112 may function as a negative electrode. Alternatively, the first electrode plate 111 and the second electrode plate 112 may function oppositely. The separator 113 may be arranged between the first and second electrode plates 111 and 112.

The first electrode plate 111 may be formed by applying a first electrode active material (such as transition metal oxide) to a first electrode current collector formed of metal foil (such as aluminum). The first electrode plate 111 may include a first electrode non-coating portion 111a to which the first electrode active metal is not applied. The first electrode non-coating portion 111a may function as a current flow passage between the first electrode plate 111 and the outside of the first electrode plate 111, e.g., a passage between the coated portions of the first electrode plate 111 and the first current collector 120. In the current embodiment, materials that may be used to form the first electrode plate 111 are not limited to the above-mentioned materials.

The second electrode plate 112 may be formed by applying a second electrode active material (such as graphite or carbon) to a second electrode current collector formed of metal foil (such as aluminum foil). The second electrode plate 112 may include a second electrode non-coating portion 112a to which the second electrode active metal is not applied. The second electrode non-coating portion 112a may function as a current flow passage between the second electrode plate 112 and the outside of the second electrode plate 112, e.g., a passage between coated portions of the second electrode plate 112 and the second current collector 130. In the current embodiment, materials that can be used to form the second electrode plate 112 are not limited to the above-mentioned materials.

The separator 113 may be located between the first electrode plate 111 and the second electrode plate 112 to reduce the possibility of and/or prevent a short circuit and to enable and/or allow movement of charge (such as lithium ions). The separator 113 may be formed of a polyethylene film, a polypropylene film, or a film including polyethylene and polypropylene. In the current embodiment, materials that can be used to form the separator 113 are not limited to the above-mentioned materials.

The first and second current collectors 120 and 130 may be coupled to both end parts of the electrode assembly 110 in a manner such that the first and second current collectors 120 and 130 may be electrically connected to the first and second electrode plates 111 and 112, respectively. That is, the first and second current collectors 120 and 130 may be coupled to both end parts of the electrode assembly 110 in a manner such that the first and second current collectors 120 and 130 are connected to the first electrode non-coating portion 111a of the first electrode plate 111 and the second electrode non-coating portion 112a of the second electrode plate 112.

The first current collector 120 may be formed of a conductive material (such as aluminum or an aluminum alloy). The first current collector 120 may make contact with the first electrode non-coating portion 111a that protrudes from one end of the electrode assembly 110 so that the first current collector 120 may be electrically connected to the first electrode plate 111.

The first current collector 120 may include a first connecting part 121 and a first extending part 123, e.g., as illustrated in FIG. 3. A first terminal hole 124 and a connection hole 126 may be formed in the first connecting part 121. The first terminal hole 124 may be spaced apart from the connection hole 126. The first terminal hole 124 may provide a space through which the first electrode terminal 152 is fitted and coupled. The connection hole 126 may provide a space through which a first side of the first short-circuit member 170 is fitted and coupled.

The first extending part 123 may be a bent portion of the first current collector 120, e.g., bent from the first connecting part 121. The first extending part 123 may extend from an end of the first connecting part 121 and may be shaped as a plate making contact with the first electrode non-coating portion 111a, e.g., making contact with each of a plurality of first electrode non-coating portions 111a. Assuming that a corner where the first connecting part 121 and the first extending part 123 meet is denoted by C, the first connecting part 121 and the first extending part 123 may be perpendicular to each other about the corner C.

The second current collector 130 may be formed of a conductive material (such as copper, a copper alloy, nickel, or a nickel alloy). The second current collector 130 may make contact with the second electrode non-coating portion 112a protruding to the other end of the electrode assembly 110 to be electrically connected to the second electrode plate 112.

The second current collector 130 may include a second connecting part 131 and a second extending part 133, e.g., as illustrated in FIG. 4. A second terminal hole 134 may be formed in the second connecting part 131. The second terminal hole 134 may provide a space to which the second electrode terminal 153 is fitted and coupled. The second connecting part 131 may exclude a connection hole, e.g., the connection hole 126 that has the short-circuit member 170 fitted and coupled thereto. The second extending part 133 may be bent from the second connecting part 131 and may extend from an end of the second connecting part 131. The second extending part 133 may be shaped as a plate making contact with the second electrode non-coating portion 112a, e.g., with each of a plurality of second electrode non-coating portions 112a. Assuming that a corner where the second connecting part 131 and the second extending part 133 meet is denoted by C, the second connecting part 131 and the second extending part 133 may be perpendicular to each other about the corner C.

The case 140 may be formed of a conductive material (such as aluminum, an aluminum alloy, or nickel plated steel). The case 140 may have an approximately hexahedron shape with an opening so that the electrode assembly 110, the first current collector 120, and the second current collector 130 may be inserted and placed in the case 140. In the illustrated embodiment the case 140 and the cap assembly 150 are shown as being coupled to each other, and the peripheral part of the cap assembly 150 substantially corresponds to the opening of the case 140. The inner surface of the case 140 may be insulated to be electrically insulated from the electrode assembly 110, the first current collector 120, and the second current collector 130. Accordingly, the case 140 may be electrically neutral.

The cap assembly 150 may be coupled to the case 140. For example, the cap assembly 150 may include a cap plate 151, the first electrode terminal 152, the second electrode terminal 153, gaskets 154, first nuts 155a, first upper insulation members 158, lower insulation members 162, and the first short-circuit member 170.

The cap plate 151 may close the opening of the case 140 and may have a short-circuit hole 151c formed therein. The short-circuit hole 151c may accommodate the first short-circuit member 170. The cap plate 151 may formed of the same material as the case 140. The cap plate 151 may have the same polarity as that of the case 140. The cap plate 151 may be electrically neutral.

The first electrode terminal 152 may penetrate one side of the cap plate 151 to be electrically connected to the first current collector 120. The first electrode terminal 152 may have a pillar shape. A thread may be formed on the outer surface of an upper pillar portion of the first electrode terminal 152, e.g., the upper pillar portion may be on an outside of the case 140. The first electrode terminal 152 may protrude to an upper portion of the cap plate 151. A flange 152a may be formed on a lower pillar portion positioned under the cap plate 151 so that the first electrode terminal 152 may not be easily separated from the cap plate 151. The pillar portion positioned corresponding to a portion of the flange 152a may be fitted to the first terminal hole 124 of the first current collector 120.

The second electrode terminal 153 may penetrate another side of the cap plate 151 to be electrically connected to the second current collector 130. The second electrode terminal 153 may have substantially the same shape as the electrode terminal 152. Thus, descriptions thereof will not be repeated. The second electrode terminal 153 may similarly include a flange portion that is fitted to the second terminal hole 134 of the second current collector 130.

The gaskets 154 may be formed of an insulating material. The gaskets 154 may be located between the cap plate 151 and the first and second electrode terminals 152 and 153, respectively. The gaskets 154 may seal gaps between the cap plate 151 and the first and second electrode terminals 152 and 153, respectively. The gaskets 154 may reduce the possibility of and/or prevent permeation of moisture into the secondary battery 100A and/or leakage of electrolyte from the inside of the secondary battery 100A to an outside of the secondary battery 100A.

The first upper insulation members 158 may be located between the cap plate 151 and the first and second electrode terminals 152 and 153, respectively. The first upper insulation members 158 may allow the first and second electrode terminals 152 and 153, respectively, to be fitted to the cap plate 151. The first upper insulation members 158 may make tight contact with the cap plate 151 and with the gaskets 154, e.g., in an area through which the first and second electrode terminals 152 and 153 extend through the cap plate 151. The first upper insulation members 158 may insulate the cap plate 151 from the first and second electrode terminals 152 and 153, respectively.

The first nuts 155a may be fastened along the threads formed in the first electrode terminal 152 and the second electrode terminal 153, e.g., to fix the first electrode terminal 152 and the second electrode terminal 153 to the cap plate 151.

The lower insulation members 162 may be located between the cap plate 151 and the first and second current collectors 120 and 130, respectively. The lower insulation members 162 may reduce the possibility of and/or prevent an unnecessary short circuit.

The first short-circuit member 170 may include a pipe member 171 and an inversion plate 175.

The pipe member 171 may have a continuous shape such as a substantially cylindrical pipe shape, e.g., so as to be formed along sidewalls of various openings. A first side of the pipe member 171, e.g., a lower portion of the pipe member 171, may be fastened to the connection hole 126 of the first current collector 120 to be connected, e.g., electrically connected, to the first electrode terminal 152. For example, the first side of the pipe member 171 may be coupled to the connection hole 126 of the first current collector 120 by a rivet, e.g., a lowermost portion of the pipe member 171 may be in contact with a surface of the first current collector 120 that faces the electrode assembly 110. The pipe member 171 may be connected to the inside of the case 140 through the connection hole 126 of the first current collector 120.

A second side of the pipe member 171, e.g., an upper portion of the pipe member 171, may be exposed to an upper portion of the cap plate 151, e.g., may be exposed to the outside of the case 140. The second side of the pipe member 171 may penetrate, e.g., extend through, a short circuit hole 151c of the cap plate 151. The second side of the pipe member 171 may also extend through one of the lower insulation members 162.

A second upper insulation member 175a may be formed between the second side of the pipe member 171 and the short circuit hole 151c of the cap plate 151. Accordingly, the pipe member 171 and the cap plate 151 may be electrically insulated from each other. The second upper insulation member 175a may be on one of the lower insulation members 162.

The inversion plate 175 may cover an opening, e.g., a center portion, of the second side of the pipe member 171. The inversion plate 175 may be electrically connected to the pipe member 171. The inversion plate 175 may have a downwardly convex round part (e.g., forming a lowermost portion of the inversion plate 175 that corresponds to approximately a center of the pipe member 171) and an edge part (e.g., forming uppermost support portions of the inversion plate 175) fixed to a top end of the second side of the pipe member 171. The inversion plate 175 may be a semi-flexible element. Without intending to be bound by this theory, when the internal pressure of the case 140 exceeds a preset pressure (e.g., due to overcharge, penetration, and/or external short circuit occurring to the secondary battery) the inversion plate 175 may be inverted and protrude upward. For example, the convex round part may move upward to form a concave round part being an uppermost portion of the inversion plate 175.

Referring to FIG. 1, the first connecting member 163 may electrically connect electrode terminals of adjacent secondary batteries among the first to sixth secondary batteries 100A, 100B, 100C, 100D, 100E, and 100F. The first connecting member 163 may have a substantially plate-like shape and two holes may be formed therein, e.g., the holes may be formed on opposing ends. The two holes may each be fitted to an electrode terminal of adjacent secondary batteries having different polarities. Therefore, the first connecting member 163 may connect the adjacent secondary batteries to each other in series. A second nut 155b may be fastened to the electrode terminal to which the first connecting member 163 is fitted along the thread of the electrode terminal to fix the first connecting member 163 to the electrode terminal. The first connecting member 163 may include a plurality of first connecting members 163 arranged on opposing sides of the first to sixth secondary batteries 100A, 100B, 100C, 100D, 100E, and 100F, and the second short-circuit member 180 may be arranged between the plurality of first connecting members 163.

The secondary battery module 100 may further include a second connecting member 165 connecting the first to sixth secondary batteries 100A, 100B, 100C, 100D, 100E, and 100F connected to each other in series to external electrode terminals 10A and 10B, e.g., as illustrated in FIG. 5. The second connecting member 165 may be connected to the highest and lowest potential electrode terminals of the secondary batteries among the first to sixth secondary batteries 100A, 100B, 100C, 100D, 100E, and 100F connected to each other in series.

According to an exemplary embodiment, the second connecting member 165 may electrically connect the highest potential electrode terminal to the external positive electrode terminal 10A. The second connecting member 165 may electrically connect the lowest potential electrode terminal to the external positive electrode terminal 10B. The second connecting member 165 may have substantially the same shape as the first connecting member 163. The second connecting member 165 may only be coupled with one of the electrode terminals instead of two of the electrode terminals like the first connecting member 163. However, the current embodiment is not limited to such a shape, and the second connecting member 165 may have various shapes.

The second short-circuit member 180 may be electrically connected to the external terminals, e.g., to the external electrode terminals 10A and 10B. The second short-circuit member 180 may be arranged to face the inversion plate 175 of the first short-circuit member 170, e.g., the second short circuit member 180 may face each or at least one of the inversion plates 175 of the first to sixth secondary batteries 100A, 100B, 100C, 100D, 100E, and 100F. The second short-circuit member 180 may overlap the inversion plate 175 and may not be in contact therewith when the inversion plate 175 has the convex shape extending toward the inside of the case 140. The second short-circuit member 180 may make contact with the inversion plate 175 when the inversion plate 175 has been inverted and protrudes toward the outside of the case 140.

The second short-circuit member 180 may include a center part 181 and a plurality of branch parts 183. The center part 181 may be formed shaped as a bar and may be electrically connected to the external negative electrode terminal 10B. The center part 181 may be disposed above, e.g., in an overlapping relationship, with each of the first to sixth secondary batteries 100A, 100B, 100C, 100D, 100E, and 100F. An insulation plate 185 may be formed under the center part 181, e.g., on a bottom surface of the center part 181. The insulation plate 185 may reduce the possibility of and/or prevent an unnecessary short circuit between the second short-circuit member 180 and the cap plate 151. The insulation plate 185 may be excluded under the plurality of branch parts 183.

The plurality of branch parts 183 may extend from opposing sides of the center part 181, e.g., portions of the branch parts 183 may extend at an upward angle from the center part 181 toward the first connecting members 163. The plurality of branch parts 183 may be arranged to be spaced a predetermined distance apart from inversion plates 175 of the first short-circuit members 170, while still overlapping the inversion plates 175. For example, each branch part 183 may have a lower surface that faces the inversion plate 175 of one of the first to sixth secondary batteries 100A, 100B, 100C, 100D, 100E, and 100F. The predetermined distance between the plurality of branch parts 183 and the inversion plates 175 of the first short-circuit members 170 may be large enough to allow the protruding inversion plates 175 to make contact with the plurality of branch parts when the inversion plates 175 of the first short-circuit members 170 are inverted and protrude toward an outside of the case 140.

The secondary battery module 100 may further include a detector 191 and a controller 193. The detector 191 may be connected to the second short-circuit member 180 to detect a voltage of the second short-circuit member 180. The controller 193 may control charging of the secondary battery module 100 according to whether the voltage of the second short-circuit member 180 is detected by the detector 191. Configurations of the detector 191 and the controller 193 will be described below in detail when describing the operation of the secondary battery module 100.

Hereinafter, the operation of the secondary battery module 100 in an event of overcharge will be described in detail.

Figure 6:
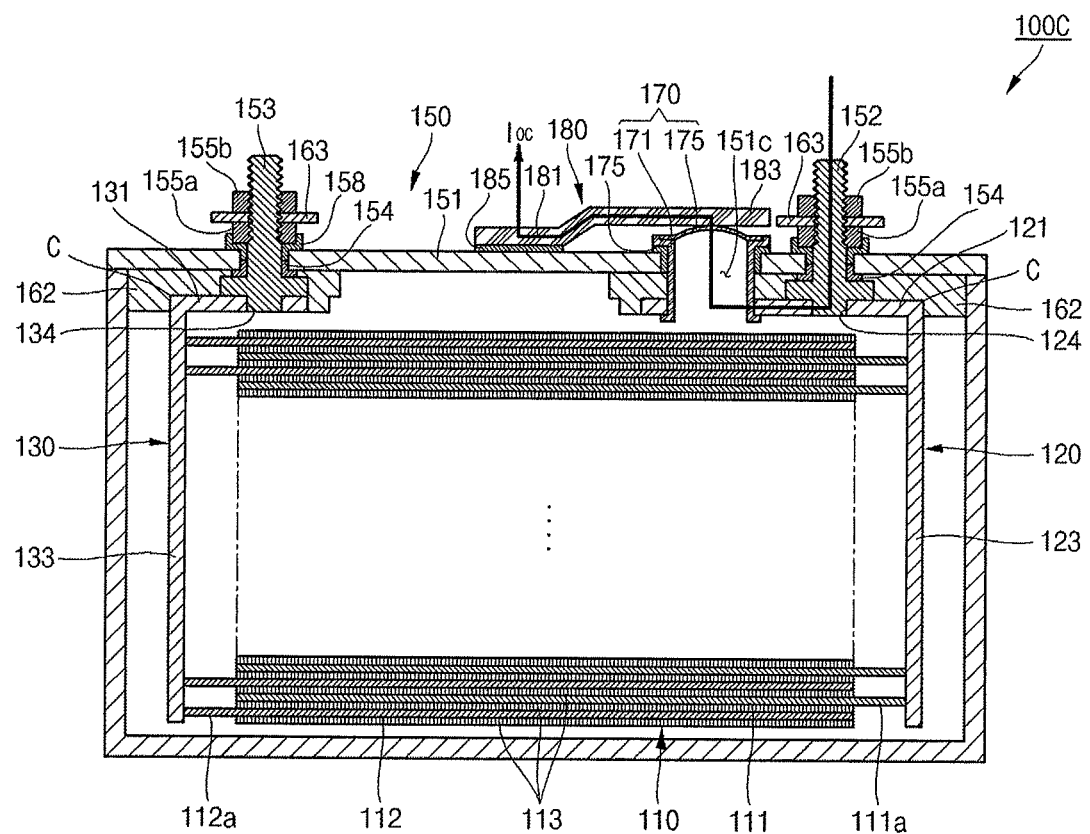
FIG. 6 illustrates an operation of the secondary battery module according to an exemplary embodiment in an event of overcharge along the line II-II' of FIG. 1.

FIGS. 6 and 7 illustrate the operation of the secondary battery module 100 according to an exemplary embodiment in an event of overcharge. First, before describing the operation of the secondary battery module 100, it is assumed that overcharge occurs to an arbitrary secondary battery among the first to sixth secondary batteries 100A, 100B, 100C, 100D, 100E, and 100F. For example, it is assumed that overcharge occurs at the third secondary battery 100C. Accordingly, FIG. 6 illustrates an exemplary event of overcharge along the line II-II' of FIG. 1.

As assumed above, when overcharge occurs to the third secondary battery 100C, the internal pressure of the case 140 of the third secondary battery 100C increases. Here, if the internal pressure of the case 140 of the third secondary battery 100C exceeds a preset pressure, the inversion plate 175 of the first short-circuit member 170 may be inverted to protrude to the outside of the case 140, as shown in FIG. 6. The inversion plate 175 of the first short-circuit member 170 may make electrical contact with the corresponding one of branch parts 183 of the second short-circuit member 180 facing the inversion plate 175 of the first short-circuit member 170.

Accordingly, as shown in FIGS. 6 and 7, over-current generated from the third secondary battery 100C due to overcharge may directly flow to the external negative electrode terminal 10B through the first short-circuit member 170 and the second short-circuit member 180, rather than other secondary batteries such as the fourth to sixth secondary batteries 100D, 100E, and 100F. Accordingly, the second short-circuit member 180 may provide a by-pass route for the over-current so that the over-current may by-pass the other secondary batteries, e.g., the fourth to sixth secondary batteries 100D, 100E, and 100F.

When the overcharge occurs to the secondary battery module 100, over-current may flow through the second short-circuit member 180 and the detector 191 may detect a voltage from the second short-circuit member 180. Then, an overcharge notice signal may be transmitted to the controller 193 to notify the controller 193 that the voltage has been detected from the second short-circuit member 180. The controller 193 may control charging of the secondary battery module 100 to be interrupted in response to the overcharge notice signal received from the detector 191. For example, the controller 193 may physically or electrically disconnect the external electrode terminals 10A and 10B and the secondary batteries.

According to the exemplary embodiments, when overcharge occurs to an arbitrary secondary battery among the plurality of secondary batteries connected to each other in series, over-current generated from the overcharged secondary battery may flows to the external electrode terminal through the first short-circuit member 170 and the second short-circuit member 180, rather than to the next secondary battery adjacent to the overcharged battery. Therefore, the other batteries may be protected from being damaged. Accordingly, the fail-safe function and stability of the secondary battery module may be improved.

In addition, the same effect may be demonstrated in an event of penetration and/or external short circuit as well as overcharge of battery. Further, it is may not be necessary to provide a fuse in each secondary battery, the secondary battery may have improved durability.

By way of summation and review, unit batteries may each include a case accommodating an electrode assembly, a cap assembly coupled to the case and sealing the case, and positive and negative electrode terminals protruding through the cap assembly and electrically connected to current collectors of positive and negative electrodes of the electrode assembly. The respective unit batteries may together constitute a secondary battery module, which is a large-capacity battery module, by connecting the positive and negative electrode terminals of adjacent unit batteries using a bus bar.

The secondary battery module may have electrode terminals in forms of external threads. Further, the respective unit batteries may be connected to each other in series so that bus bars as conductor are inserted into positive electrode terminals of ones of the unit batteries and negative electrode terminals of adjacent unit batteries. Fastening nuts may be fastened to the terminals and the bus bar may be fixed within the secondary battery module.

Since the respective unit batteries are connected to each other in series, in an event of overcharge, penetration, and/or external short-circuit occurring to any one of the unit batteries, over-current may flow from the unit battery undergoing the event (e.g., of overcharge, penetration, and/or external short-circuit) to the last connected unit battery, resulting in damage being caused to other unit batteries that did not undergo the event.

In contrast, embodiments relate to providing a secondary battery module having improved fail-safe function and stability to an event such as overcharge, penetration, and/or external short-circuit in one of the unit batteries.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

What is claimed is:

1. A secondary battery module, comprising:
a plurality of secondary batteries, each of the secondary batteries including an electrode assembly, a case accommodating the electrode assembly, an electrode terminal electrically connected to the electrode assembly, and a first short-circuit area electrically connected to the electrode terminal, the first short-circuit area including:
(a) a surface to protrude outwardly relative to the case when an internal pressure of the case exceeds a preset pressure, and
(b) a pipe to direct the internal pressure toward the surface;
a connector electrically connecting electrode terminals of adjacent ones of the secondary batteries; and
a second short-circuit area overlapping the first short-circuit area of at least one of the plurality of secondary batteries, the second short-circuit area contacting the first short-circuit area when the first short-circuit member protrudes outwardly relative to the case.

2. The secondary battery module as claimed in claim 1, further comprising a detector that detects a voltage applied to the second short-circuit area when the first short-circuit area protrudes outwardly relative to the case.

3. The secondary battery module as claimed in claim 2, further comprising a controller that controls charging of the secondary batteries according to whether the voltage is detected by the detector.

4. The secondary battery module as claimed in claim 3, wherein, when the voltage is detected by the detector, the controller controls charging of the secondary batteries to be interrupted.

5. The secondary battery module as claimed in claim 1, wherein:
the electrode assembly of each of the secondary batteries includes a first electrode plate, a second electrode plate, and a separator arranged between the first electrode plate and the second electrode plate, and
the electrode terminal of each of the secondary batteries includes a first electrode terminal electrically connected to the first electrode plate and a second electrode terminal electrically connected to the second electrode plate.

6. The secondary battery module as claimed in claim 1, wherein:
the pipe has a first side electrically connected to the first electrode terminal and a second side penetrating a cap plate on the case, the second side being exposed outside of the case, and
the surface includes an inversion plate covering an opening at the second side of the pipe, the inversion plate to invert when the internal pressure exceeds the preset pressure.

7. The secondary battery module as claimed in claim 5, wherein each of the secondary batteries includes:
a first current collector electrically connecting the first electrode plate, the first electrode terminal, and the first short-circuit area, and
a second current collector electrically connecting the second electrode plate and the second electrode terminal.

8. The secondary battery module as claimed in claim 7, wherein:
the first current collector includes a first connecting surface connected to the first electrode terminal and the first short-circuit area, and the first current collector includes a first extending surface extending from the first connecting surface and coupled to the first electrode plate, and
the first short-circuit area is coupled to a connection hole in the first connecting surface.

9. The secondary battery module as claimed in claim 8, wherein:
the pipe has a first side coupled to the connection hole of the first connecting surface and a second side penetrating a cap plate on the case, the second side being exposed to an outside of the case,
the first side of the pipe is connected to an inside of the case through the connection hole of the first connecting surface, and
the surface of the first short-circuit area includes an inversion plate covering an opening at the second side of the pipe, the inversion plate to invert when the internal pressure exceeds the preset pressure.

10. The secondary battery module as claimed in claim 9, wherein the second short-circuit area includes:
a center surface electrically connected to an external terminal, and
a plurality of branch parts extending from the center surface, each of the plurality of branch parts facing the inversion plate of the first short-circuit area of a corresponding one of the plurality of secondary batteries.

11. The secondary battery module as claimed in claim 7, wherein the second current collector of each of secondary batteries includes:
a second connecting surface connected to the second electrode terminal, and
a second extending surface extending from the second connecting surface and coupled to the second electrode plate of the electrode assembly.

12. The secondary battery module as claimed in claim 1, wherein the second short-circuit area includes:
a center surface electrically connected to an external terminal, and
a plurality of branch parts extending from the center surface, each of the plurality of branch parts facing an inversion plate of the first short-circuit area of a corresponding one of the plurality of secondary batteries.

13. The secondary battery module as claimed in claim 1, wherein, in each of secondary batteries, the electrode terminal and the first short-circuit area are electrically insulated from the case.

14. The secondary battery module as claimed in claim 1, wherein the second short-circuit area is electrically connected to an external electrode terminal of the secondary battery module.

15. The secondary battery module as claimed in claim 1, wherein:
the connector includes a plurality of connecting members, the connecting members overlapping opposing end regions of the secondary batteries, and
the second short-circuit area overlaps each of the secondary batteries along a central region of the secondary batteries, the central region being between the opposing end regions.

16. The secondary battery module as claimed in claim 1, wherein:
the plurality of secondary batteries are arranged in a serial connection such that the secondary batteries are serially connected to each other, and
the second short-circuit area is a by-pass route for the serial connection between the plurality of secondary batteries.

17. The secondary battery module as claimed in claim 1, wherein, when the internal pressure of the case is below the preset pressure, the second short-circuit area is in a non-contacting relationship with the first short-circuit area of the at least one of the plurality of secondary batteries and the first short-circuit area protrudes inwardly toward the electrode assembly.

18. The secondary battery module as claimed in claim 1, wherein the surface of the first short-circuit area contacts the second short-circuit area when the internal pressure exceeds the preset pressure.

19. The secondary battery module as claimed in claim 1, wherein a length of the pipe is greater than a thickness of the case.

20. The secondary battery module as claimed in claim 1, wherein the second short-circuit area is spaced from the electrode terminal.

21. The secondary battery module as claimed in claim 1, wherein the surface is outside the case when the internal pressure of the case be below the preset pressure.

\* \* \* \* \*